United States Patent
Cottogni

(10) Patent No.: US 8,726,715 B2
(45) Date of Patent: May 20, 2014

(54) METHOD AND DEVICE FOR CALIBRATING A TORQUE MEASUREMENT UNIT

(75) Inventor: Michael Cottogni, Graz (AT)

(73) Assignee: AVL List GmbH, Graz (AT)

( * ) Notice: Subject to any disclaimer, the term of this patent is extended or adjusted under 35 U.S.C. 154(b) by 448 days.

(21) Appl. No.: 12/929,293

(22) Filed: Jan. 12, 2011

(65) Prior Publication Data

US 2011/0167890 A1     Jul. 14, 2011

(30) Foreign Application Priority Data

Jan. 14, 2010   (AT) ................................. GM21/2010

(51) Int. Cl.
*G01L 25/00*      (2006.01)

(52) U.S. Cl.
USPC .............................................. 73/1.09; 73/862

(58) Field of Classification Search
USPC ...................................... 73/862, 862.08, 1.09
See application file for complete search history.

(56) References Cited

U.S. PATENT DOCUMENTS

| | | | | |
|---|---|---|---|---|
| 4,483,177 A | * | 11/1984 | McIntyre et al. | ............... 73/1.11 |
| 5,426,986 A | * | 6/1995 | Brassert et al. | ............ 73/862.09 |
| 5,795,262 A | * | 8/1998 | Robinson | ........................ 477/92 |
| 7,222,015 B2 | * | 5/2007 | Davis et al. | .................... 701/103 |
| 8,062,179 B2 | * | 11/2011 | Eriksson et al. | ............... 477/107 |
| 2002/0117012 A1 | * | 8/2002 | Lec | ........................... 73/862.338 |
| 2008/0127711 A1 | * | 6/2008 | Farag | .............................. 73/1.11 |

FOREIGN PATENT DOCUMENTS

| | | | |
|---|---|---|---|
| DE | 102007040106 | | 2/2009 |
| JP | 2003149065 | | 5/2003 |
| JP | 2006090745 | | 4/2006 |
| JP | 2006090967 | | 4/2006 |
| JP | 2006220572 A | * | 8/2006 |
| JP | 2009/109309 | * | 5/2009 |
| WO | 2006099641 | | 9/2006 |

OTHER PUBLICATIONS

English abstract of WO2006099641.
English abstract of DE102007040106.

\* cited by examiner

*Primary Examiner* — Peter Macchiarolo
*Assistant Examiner* — Mohammed Keramet-Amircolai
(74) *Attorney, Agent, or Firm* — Dykema Gossett PLLC

(57) ABSTRACT

To achieve high precision in a test stand environment, a method and a device for calibrating a torque measurement unit includes connecting the torque measurement unit with a dynamometer, a set point speed $n_{soll}$ larger than 0 rpm is specified for a speed regulator, whereby the speed regulator generates a set point torque $T_{soll}$, which is upwardly limited by a reference torque limit $T_{max}$ that can be specified, and the reference torque that is limited in this way is specified to the dynamometer as reference torque $T_{stell}$.

8 Claims, 1 Drawing Sheet

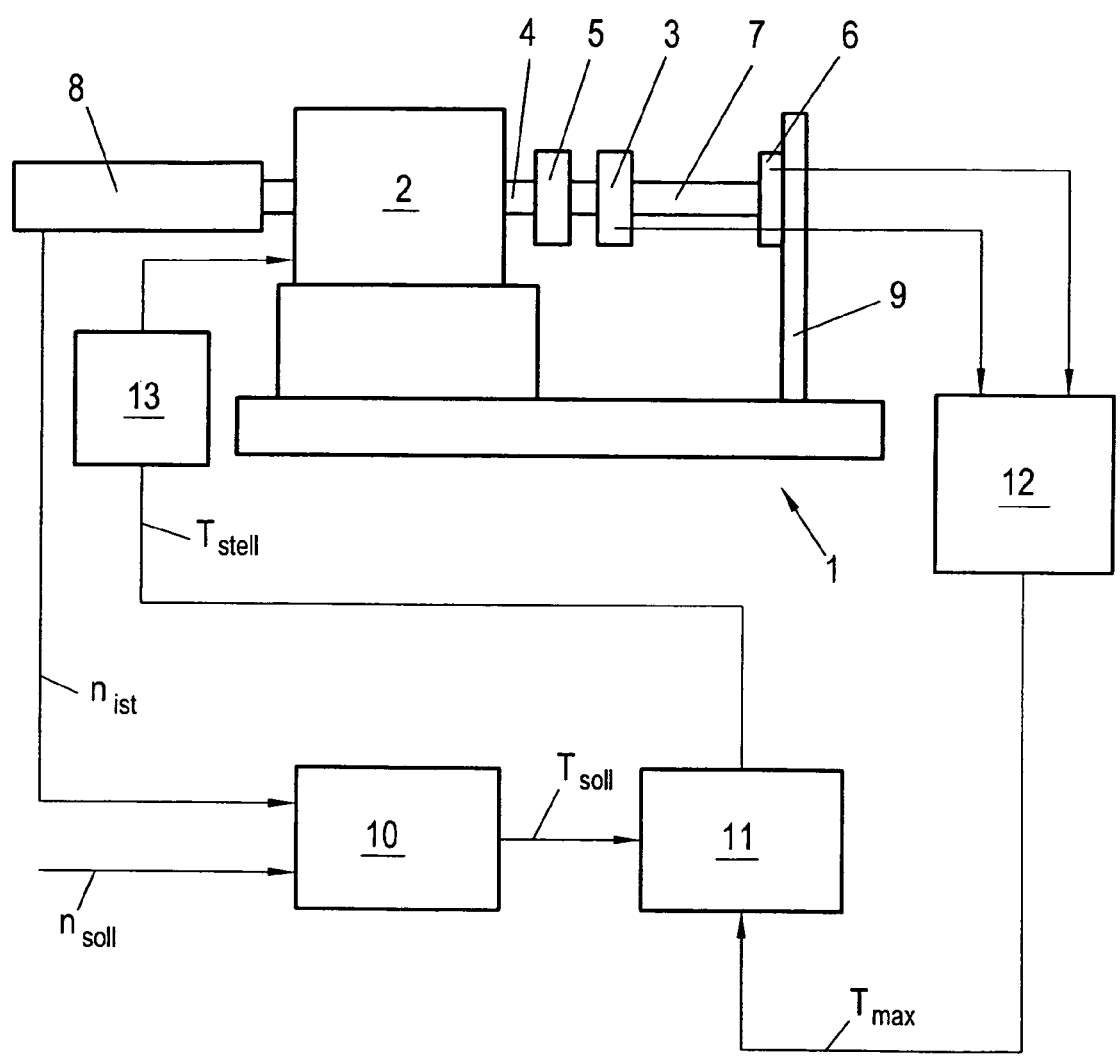

METHOD AND DEVICE FOR CALIBRATING A TORQUE MEASUREMENT UNIT

BACKGROUND OF THE INVENTION

1. Field of the Invention

The present invention relates to a method and a device for calibrating a torque measurement unit that is connected with a dynamometer, whereby the torque measured by the torque measurement unit and that of a reference measurement device is compared for calibration.

2. The Prior Art

On test stands for vehicles or vehicle components such as, for example, transmissions, power trains, combustion engines, etc., the test specimen is driven or charged by an dynamometer, a so-called dyno, in order to simulate certain operating conditions for the test specimen. To do so, as a rule, a number of sensors are also used in order to capture various measurement values. In particular, in such test stand structures, driving speed sensors and torque sensors are used. While the number of rotations can be measured very precisely with various methods, as a torque measurement unit for the measurement of the torque, often so-called torque measurement flanges are used, which are mounted between the driven shaft of the dyno and the drive shaft of the test specimen. But dynos that are mounted to oscillate are also known, in which as torque measurement unit, for example, a beam in bending or a load cell are used, which measure the force between stator and the machine housing, by means of which the acting torque can be inferred. Torque measurement units must, however, be calibrated in order to make precise measurements possible. The calibration must also be regularly repeated during running operation. For this, numerous methods exist in the prior art as to how such a torque measurement unit such as, for example, a torque measurement flange, a beam in bending or a load cell can be calibrated.

Frequently, calibration levers are used that are affixed to a lever mounted at the shaft, to which at a certain distance a certain weight is mounted, and by means of which a defined torque is generated that is captured by the torque measurement unit. Due to the determination of the difference between the measured value and the introduced value, the torque measurement unit can subsequently be calibrated. An example of this can be found, for example in WO 2006/099641 A1. But as a result of such a calibration lever, bending and horizontal forces are also always introduced, which can falsify the measurement result.

From DE 10 2007 040 106 A1 a calibration unit is known in which the electric motor is connected to the torque measurement device by means of a transmission, here a torque measurement flange. Thus, for calibration by means of the electric motor and the transmission, a certain torque can be introduced, which is measured by the torque measurement unit, but whereby for calibration, the performance brake must be blocked. But the calibration unit is also costly in design and due to its size and weight, it is also difficult to handle.

It is further known of machine tools, for example, from U.S. Pat. No. 4,483,177, to use the drive motor of the machine tool itself for generating the torque for calibration of the torque sensor. However, for machine tools, significantly lower precision is required. For this reason, here, only a certain speed is specified at which a screw nut on a threaded spindle drives against a stop, as a result of which a certain torque is created, which can be measured by the torque measurement unit and a reference torque measurement device and subsequently compared for calibration. But it is not possible here (and also not necessary) to set any kind of precise calibration torques.

However, high demands on precision must be satisfied in a test stand environment. For the calibration of the torque measurement unit at a precision that is sufficient for test stand applications, the torque must be applied in suitable form during the measurement (and/or calibration). In order to be able to determine the hysteresis of the torque measurement unit that is to be calibrated and to not destroy it, the applied torque is to have as little waviness as possible and preferably no excess oscillation. Moreover, torque measurement units are, as a rule, calibrated within a certain calibration range and are not calibrated only at an individual torque, which makes it necessary (within the possibilities) that any calibration torques are specified. In particular, in a test stand environment, certain safety provisions must also be made. For example, when a shaft breaks, the dyno may not continue to drive uncontrolled, but must be stopped immediately. Therefore, it is not sufficient for calibration with the drive motors to simply specify a torque for the drive motor, as the drive motor would run away uncontrolled in the event of a broken shaft.

It is therefore the objective of the present invention to provide a method and a device for calibrating a torque measurement unit that is simply constructed, sufficiently precise and can also be handled easily, while making a flexible specification of the calibration torques possible and also satisfying the safety requirements.

SUMMARY OF THE INVENTION

This problem is solved in accordance with the invention by connecting the dynamometer with the reference measurement unit, which is mounted so as not to rotate, a set point speed is specified of larger than 0 rpm by a speed regulator and the speed regulator generates a reference torque, which is upwardly limited by a predeterminable reference torque limit, and the set point torque of the dynamometer that is limited in this way is specified as reference torque. With that, the requirements that have been posed are satisfied, namely a calibration torque that can be set at any point between 0 Nm and $\pm T_{dyno\_max}$, high precision due to specification of a set point torque $T_{soll}$ and safety function against uncontrolled runaway of the dynamometer in the event of a shaft break. Thereby, the speed regulator ensures the necessary safety, as in the case of a broken shaft, it immediately reduces the set point torque and does not let the speed rise above the selected, preferably lower value of the set point speed, and the reference torque limit ensures the setting of the calibration range with sufficient precision. Beyond that, the device in accordance with the invention can also be easily handled and makes a quick calibration of the torque measurement unit possible.

When high-frequency torque components are damped, the precision of calibration can be increased even further.

The result of the calibration is advantageously also used in order to change a parameter of the regulator unit of the dynamometer, so that the dynamometer becomes more precise with respect to the setting of the specified reference torque. Thereby, the calibration precision can also be increased.

BRIEF DESCRIPTION OF THE DRAWINGS

The present invention will be described in more detail in conjunction with the attached FIG. 1, which shows, by way of example, an advantageous embodiment, which is not limiting, in an example of a torque measurement flange, a schematic illustration of the calibration unit according to the invention.

DETAILED DESCRIPTION OF THE PREFERRED EMBODIMENTS

In FIG. 1 a test stand 1 with an engine and a dynamometer 2 (dyno) is shown. A torque measurement unit 3 such as, for example, a torque measurement flange is mounted on a shaft 4 of the dynamometer 2. In normal operation, the dynamometer 2 is connected with the test specimen, such as, e.g., a combustion engine, a transmission or a power train (not shown here), by a connection shaft 7. For calibrating the torque measurement unit 3, the test specimen is removed and the dynamometer 2 is connected by means of the connection shaft 7 with a reference measurement unit 6, which, for example, is fixedly mounted so as not to rotate by means of a blocking unit 9 such as, for example, a simple support. For the calibration, a reference torque $T_{stell}$ is specified for the dynamometer 2, this reference torque being present at the torque measurement unit 3, as well as at the reference measurement unit 6, due to the rotationally fixed support of the reference measurement unit 6, and can be measured. By comparing the measured torque values at the measurement unit 3 and the reference measurement unit 6, the torque measurement unit 3 can then be calibrated correspondingly. For the calibration, the reference torque $T_{stell}$ is, as a rule, varied in discrete steps within a calibration range.

The calibration for a dynamometer 2 mounted oscillating takes place equivalently, whereby here the reference measurement unit 6 can be connected with a shaft 4 of the dynamometer 2.

In order to give the dynamometer 2 a reference torque $T_{stell}$ for calibration, a speed regulator 10 is now provided, to which the actual engine speed $n_{ist}$ of the dynamometer 2 is fed by a speed sensor 8. Further, at an inlet of the speed regulator 10, a set point speed $n_{soll}$ is present, which is larger than 0 Umin$^{-1}$. Preferably, as set point speed $n_{soll}$, a very low speed is specified, approximately in the range of 1 to 10 Umin$^{-1}$. The speed regulator 10 generates a set point torque $T_{soll}$ at the outlet, which is, however, not specified directly to the dynamometer 2, but is fed to a reference torque limit unit 11. A maximum torque $T_{max}$ is specified for the reference torque limit unit 11, for example, by a control unit 12, for example, a test stand or calibration control unit, and upwardly limits the input set point torque $T_{soll}$ to the specified maximum torque. The set point torque limited in this way is then specified for the dynamometer 2 as reference torque $T_{stell}$, which then sets it with the pertaining control unit 13 such as, for example, a frequency converter with corresponding control.

As the dynamometer 2 is retained by rotationally fixed reference measurement unit 6 ($n_{ist}=0$), the speed regulator 10, due to the set point speed specification $n_{soll}>0$, very quickly (depending on the selected regulator dynamics) reaches saturation, and outputs at its output the largest set point torque $T_{soll}$ that can be specified by the regulator. Due to the reference torque limitation, it is then achieved that a specifiable reference torque $T_{stell}$ can be specified for the dynamometer 2. Therefore, by changing the maximum torque $T_{max}$, different reference torques $T_{stell}$ can be specified for a calibration cycle very easily.

For calibration, the values measured with the torque measurement unit 3 and the reference measurement unit 6 can be compared in a control unit 12, whereupon the torque measurement unit 3 can be calibrated depending on the deviation, for example, by changing certain adjustable parameters of the torque measurement unit 3 or its measurement or analysis electronics or measurement or analysis software.

In the case of a broken shaft, the speed of the dynamometer 2 would quickly increase, as the (now freely racing) dynamometer 2 ($n_{ist}\neq 0$) attempts to set a specified reference torque $T_{stell}$. Upon reaching or exceeding the specified set point speed $n_{soll}$, the speed regulator 10 will, however, reduce the set point torque $T_{soll}$ (below the selected reference torque limit), as a result of which the reference torque specification to the dynamometer 2 is reduced and the dynamometer 2 is very quickly slowed, whereby an uncontrolled runaway of the dynamometer 2 is avoided in the case of a broken shaft. For this purpose, as set point speed $n_{soll}$ a very low value, approximately in the range of 1 to 10 rpm, is specified.

But the results of the calibration process can also be used in order to improve the precision of the dynamometer 2 with respect to the setting of a specified reference torque $T_{stell}$. For this, the calibration result could be used, for example, in order to automatically change one or more parameters in the regulator unit 13, for example, a parameter of a frequency converter, so that the dynamometer 2 becomes more precise, e.g. more linear, relative to the reference measurement unit 6. Such an optimization problem can also be solved adequately by known mathematical methods that can be, for example, implemented in the regulator unit 13 or in the control unit 12.

Between dynamometer 2 and torque measurement unit 3 (or reference measurement unit 6) or between torque measurement unit 3 and reference measurement unit 6 or between reference measurement unit 6 and blocking unit 9, a damping unit 5, e.g., a simple flywheel, can also be provided as an oscillation damper, which dampens high-frequency torque components and lets low-frequency torques through. With that, undesired, high-frequency torque fluctuations during the calibration process are prevented, as a result of which the calibration becomes more precise.

The invention claimed is:

1. A method for calibrating a torque measuring unit comprising:
   connecting the torque measuring unit on one side to a dynamometer and on an opposite side to a reference measurement unit which is mounted to prevent rotation,
   driving the dynamometer to provide torque to the torque measuring unit and the reference unit according to a reference torque $T_{stell}$,
   measuring a first torque provided by the dynamometer with the torque measurement unit and a second torque provided by the dynamometer with the reference measurement unit,
   comparing the first and second torque measurements for calibrating the torque measuring unit, and
   deriving said reference torque $T_{stell}$ by providing a set point speed ($n_{soll}$) greater than 0 rpm, generating from the set point speed a set point torque ($T_{soll}$), and limiting the set point torque ($T_{soll}$) by a reference torque limit ($T_{max}$) to provide said reference torque ($T_{stell}$).

2. The method according to claim 1, including damping high-frequency torque components of said torque provided by said dynamometer prior to measurement of said first torque.

3. The method according to claim 1, including a step of changing said reference torque ($T_{stell}$) based on said comparing of said first and second torque measurements.

4. The method according to claim 1, wherein said set point speed ($N_{soll}$) is between 1 to 10 rpm.

5. An apparatus for measuring torque generated by a dynamometer, said apparatus comprising:

a torque measurement unit connected to the dynamometer for measuring a first value of torque provided by the dynamometer, a reference measurement unit connected to the torque measurement unit for measuring a second value of torque provided by the dynamometer, a blocking device connected to the reference measurement unit to prevent rotation thereof, a control unit for comparing said first and second torque values and generating a maximum torque ($T_{max}$) value, a speed regulator for providing a set point torque ($T_{soll}$) based on an inputted speed set point greater than zero rpm, and a reference torque limit unit for generating a reference torque ($Ts_{rell}$) supplied to the dynamometer based on said set point torque ($T_{soll}$) and limited by said maximum torque ($T_{max}$), said control unit, speed regulator and reference torque limit unit functioning to calibrate said torque measurement unit.

6. The apparatus according to claim 5, wherein the dynamometer includes an output shaft, wherein the torque measurement device is connected to the output shaft, and wherein the reference measurement unit is connected with the torque measurement unit by a connection shaft.

7. The apparatus according to claim 5, wherein the dynamometer includes an output shaft, and wherein the reference measurement unit connected to the output shaft.

8. The apparatus according to claim 6, including a damping unit between the dynamometer and the torque measurement unit, or between the dynamometer and the reference measurement unit, or between the torque measurement unit and the reference measurement unit, or between the reference measurement unit and the blocking device.

* * * * *